United States Patent
Nambiar et al.

(10) Patent No.: US 11,274,705 B2
(45) Date of Patent: Mar. 15, 2022

(54) VAPOR COMPRESSION SYSTEM AND METHOD OF EXTENDING SERVICE LIFE OF SAME

(71) Applicant: Johnson Controls Technology Company, Plymouth, MI (US)

(72) Inventors: Koman B. Nambiar, Frederick, MD (US); Tyler A. Wolgemuth, Mount Wolf, PA (US)

(73) Assignee: Johnson Controls Technology Company, Plymouth, MI (US)

( * ) Notice: Subject to any disclaimer, the term of this patent is extended or adjusted under 35 U.S.C. 154(b) by 1022 days.

(21) Appl. No.: 15/436,145

(22) Filed: Feb. 17, 2017

(65) Prior Publication Data
US 2017/0241418 A1    Aug. 24, 2017

Related U.S. Application Data

(60) Provisional application No. 62/297,513, filed on Feb. 19, 2016.

(51) Int. Cl.
*F16C 35/063* (2006.01)
*F16C 17/08* (2006.01)
(Continued)

(52) U.S. Cl.
CPC ............ *F16C 35/063* (2013.01); *F16C 17/08* (2013.01); *F16C 33/08* (2013.01); *F04D 29/059* (2013.01);
(Continued)

(58) Field of Classification Search
CPC ...... F04C 29/0064; F01C 21/02; F04B 17/03; F04B 2201/1207; F16C 32/0442;
(Continued)

(56) References Cited

U.S. PATENT DOCUMENTS 2,107,341 A * 2/1938 Peo .................. F16D 43/10
                                                192/104 R
3,183,043 A * 5/1965 Creeger ............. H02K 5/1732
                                                384/624
(Continued)

FOREIGN PATENT DOCUMENTS

CN        102767565 B   *  1/2015
EP          1262674 A2     12/2002
(Continued)

OTHER PUBLICATIONS

English Abstract of CN-102767565-B (Year: 2015).*
PCT International Search Report & Written Opinion for PCT Application No. PCT/US2017/018470 dated May 18, 2017, 14 Pages.

*Primary Examiner* — Nathan C Zollinger
(74) *Attorney, Agent, or Firm* — Fletcher Yoder, P.C.

(57) ABSTRACT

A vapor compression system including a motor having a housing and a shaft having an axis, the shaft urgable into rotational movement by the motor for powering a system component. A primary bearing and a secondary bearing are positioned in the housing for rotatably supporting the shaft, the primary bearing rotatably supporting the shaft during normal system operation. A first bearing stop and a second bearing stop are positioned on opposite sides of the secondary bearing for transmitting axial forces generated along the shaft for reaction by the motor housing during abnormal system operation. At least a portion of corresponding surfaces of each of the first bearing stop and the second bearing stop facing the secondary bearing have a protective overlying layer of material applied thereto.

18 Claims, 6 Drawing Sheets

(51) Int. Cl.
*F16C 33/08* (2006.01)
*F16C 32/04* (2006.01)
*F16C 35/04* (2006.01)
*F04D 29/059* (2006.01)
*F16C 19/54* (2006.01)

(52) U.S. Cl.
CPC .......... *F16C 19/54* (2013.01); *F16C 32/0406* (2013.01); *F16C 32/0442* (2013.01); *F16C 35/042* (2013.01); *F16C 2204/42* (2013.01); *F16C 2362/52* (2013.01)

(58) Field of Classification Search
CPC ...... F16C 32/0406; F16C 17/08; F16C 33/08; F16C 2204/42; F16C 35/042; F16C 2362/52; F16C 19/52; F16C 19/54; F16C 35/063; F16C 35/08; F16C 35/12; F04D 29/056; F04D 29/0563; F04D 29/059
See application file for complete search history.

(56) References Cited

U.S. PATENT DOCUMENTS

| | | | | |
|---|---|---|---|---|
| 3,664,718 | A * | 5/1972 | Uhtenwoldt | B23Q 1/265 384/101 |
| 3,897,987 | A * | 8/1975 | Colao | F16C 19/52 384/535 |
| 4,601,592 | A * | 7/1986 | Jatczak | F16C 19/364 384/564 |
| 4,628,522 | A * | 12/1986 | Ebersberger | F16C 32/0442 310/90.5 |
| 4,629,261 | A * | 12/1986 | Eiermann | F16C 32/0442 251/30.01 |
| 5,029,461 | A * | 7/1991 | Lawrence | B21B 31/07 384/556 |
| 5,593,234 | A * | 1/1997 | Liston | C23C 28/00 384/492 |
| 5,961,281 | A * | 10/1999 | Ojima | F01D 11/122 415/173.1 |
| 6,202,538 | B1 * | 3/2001 | Scharinger | F04B 1/0413 384/447 |
| 6,872,050 | B2 | 3/2005 | Nenstiel | |
| 7,217,039 | B2 * | 5/2007 | Baudelocque | F16C 27/04 384/624 |
| 7,879,453 | B2 * | 2/2011 | Lang | C23C 24/04 428/615 |
| 8,283,825 | B2 * | 10/2012 | Maier | F16C 32/0442 310/90 |
| 9,115,756 | B2 * | 8/2015 | Tecza | F16C 32/0442 |
| 2001/0002898 | A1 * | 6/2001 | Nii | F16C 17/026 369/269 |
| 2002/0015544 | A1 * | 2/2002 | Rode | F16C 19/548 384/551 |
| 2004/0022653 | A1 * | 2/2004 | Brunet | F16C 41/004 417/423.5 |
| 2007/0201995 | A1 * | 8/2007 | Harstad | F04D 29/0566 417/423.12 |
| 2019/0211834 | A1 * | 7/2019 | Hasegawa | F04D 29/056 |

FOREIGN PATENT DOCUMENTS

| | | | | |
|---|---|---|---|---|
| EP | 2803875 | A1 | 11/2014 | |
| EP | 2891803 | A1 * | 7/2015 | ......... F04D 25/0606 |
| EP | 2891803 | A1 | 7/2015 | |

\* cited by examiner

VAPOR COMPRESSION SYSTEM AND METHOD OF EXTENDING SERVICE LIFE OF SAME

CROSS-REFERENCE TO RELATED APPLICATION

This application claims priority to and benefit of U.S. Provisional Patent Application No. 62/297,513, entitled "VAPOR COMPRESSION SYSTEM AND METHOD OF EXTENDING SERVICE LIFE OF SAME," filed Feb. 19, 2016, which is herein incorporated by reference in its entirety.

BACKGROUND

This application relates generally to vapor compression systems incorporated in air conditioning and refrigeration applications. More specifically, this application relates to oil-free vapor compression systems.

Vapor compression systems can use compact motors operating at high rotational speeds to provide power to components. By using compact motors, a reduction in the size of the systems can be obtained. Magnetic bearings, which levitate the motor shaft, resulting in a reduction of friction and wear compared to the friction generated between the motor shaft and conventional mechanical bearings, may be used to provide primary support of the motor shaft during normal operation of such systems.

However, there are challenges associated with operating motors at higher rotational speeds, especially for "oil-free" systems. Oil-free systems do not utilize lubricating oil for lubricating mechanical bearings that provide for secondary/backup support of the motor shaft, such as when the primary magnetic bearings incur a temporary loss of function. In conventional oil-free systems, a typical backup bearing system has the ability to withstand an extremely limited number of impacts or coastdowns with the motor shaft due to compressor loads and/or a temporary loss of function of the primary bearing. As a result, the mechanical back-up bearings may be susceptible to degradation, thereby causing replacement of the mechanical back-up bearings. Unfortunately, replacement of mechanical bearings is costly and disruptive.

SUMMARY

One embodiment of the present disclosure is directed to a vapor compression system including a motor having a housing and a shaft having an axis, the shaft urgable into rotational movement by the motor for powering a system component. A primary bearing and a secondary bearing are positioned in the housing for rotatably supporting the shaft, the primary bearing rotatably supporting the shaft during normal system operation. A first bearing stop and a second bearing stop are positioned on opposite sides of the secondary bearing for transmitting axial forces generated along the shaft for reaction by the motor housing during abnormal system operation. At least a portion of corresponding surfaces of each of the first bearing stop and the second bearing stop are facing the secondary bearing having a protective overlying layer of material applied thereto.

Another embodiment of the present disclosure is directed to an oil-free vapor compression system including a motor having a housing and a shaft having an axis, the shaft urgable into rotational movement by the motor for powering a system component. A magnetic bearing and a mechanical bearing are positioned in the housing for rotatably supporting the shaft, the magnetic bearing rotatably supporting the shaft during normal system operation. A first bearing stop and a second bearing stop are positioned on opposite sides of the mechanical bearing for transmitting axial forces generated along the shaft for reaction by the motor housing during abnormal system operation. At least a portion of corresponding surfaces of each of the first bearing stop and the second bearing stop are facing the mechanical bearing having a protective overlying layer of material applied thereto.

Yet another embodiment of the present disclosure is directed to a method of extending service life of an oil-free vapor compression system. The method includes providing a motor having a housing and a shaft having an axis, the shaft urgable into rotational movement by the motor for powering a system component. A primary bearing and a secondary bearing are positioned in the housing for rotatably supporting the shaft. The method further includes rotatably supporting the shaft during normal system operation with the primary bearing. The method further includes positioning a first bearing stop and a second bearing stop on opposite sides of the secondary bearing for transmitting axial forces generated along the shaft for reaction by the motor housing. The method further includes applying a protective overlying layer of material to at least a portion of corresponding surfaces of each of the first bearing stop and the second bearing stop facing the secondary bearing.

Other features and advantages of the present disclosure will be apparent from the following more detailed description of the embodiments, taken in conjunction with the accompanying drawings which illustrate, by way of example, the principles of the disclosure.

DETAILED DESCRIPTION OF EXEMPLARY EMBODIMENTS

Figure 1:
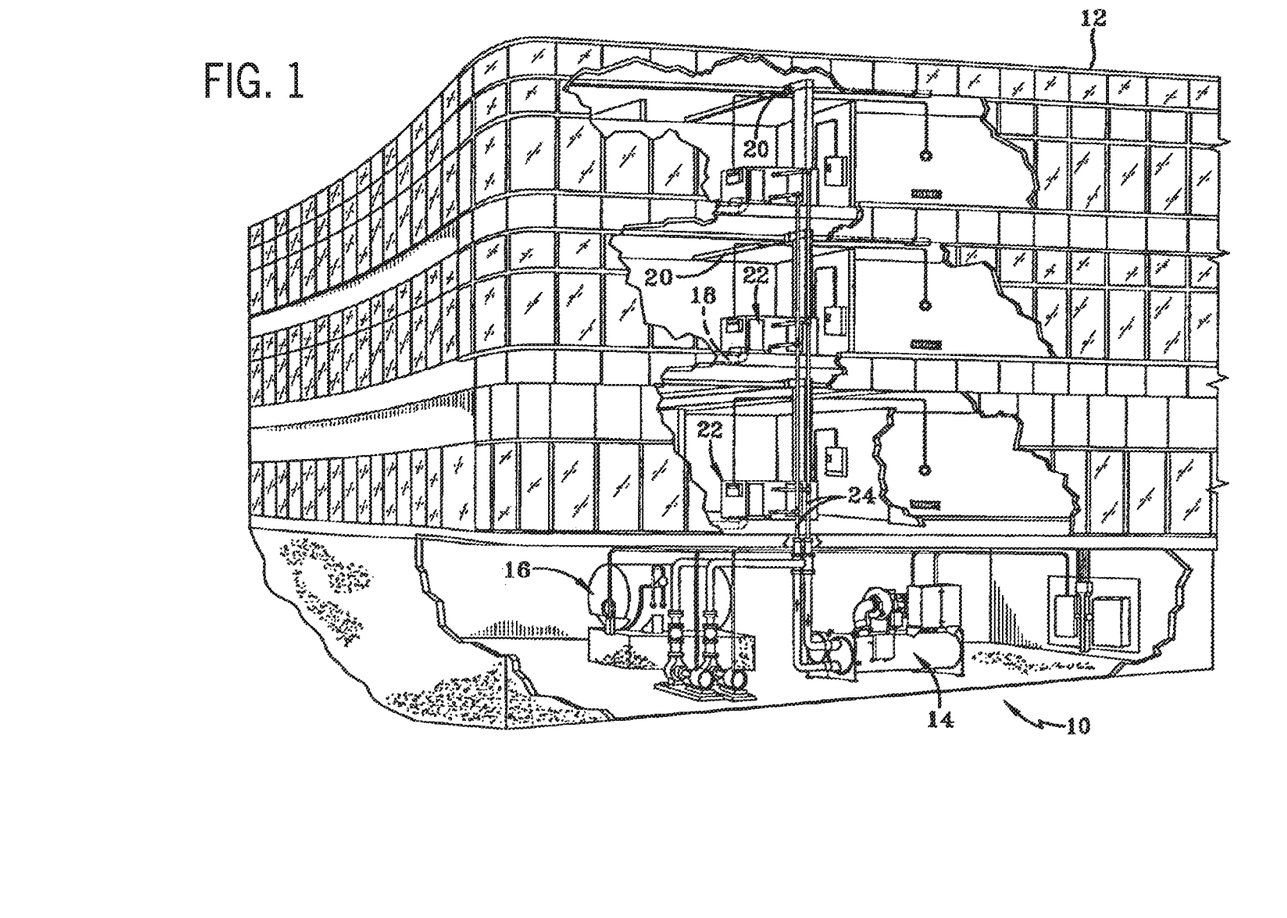
FIG. 1 illustrates an embodiment of a heating, ventilation and air conditioning system in a commercial setting.

FIG. 1 shows an environment of a heating, ventilation, air conditioning, and refrigeration (HVAC&R) system 10 in a building 12 for a typical commercial setting. The system 10 can include a vapor compression system 14 that can supply a chilled liquid which may be used to cool the building 12. The system 10 can include a boiler 16 to supply heated liquid that may be used to heat the building 12, and an air distribution system which circulates air through the building 12. The air distribution system can also include an air return duct 18, an air supply duct 20 and an air handler 22. The air handler 22 can include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the system 10. The system 10 is shown with a separate air handler on each floor of the building 12, but it is appreciated that the components may be shared between or among floors.

Figure 2:
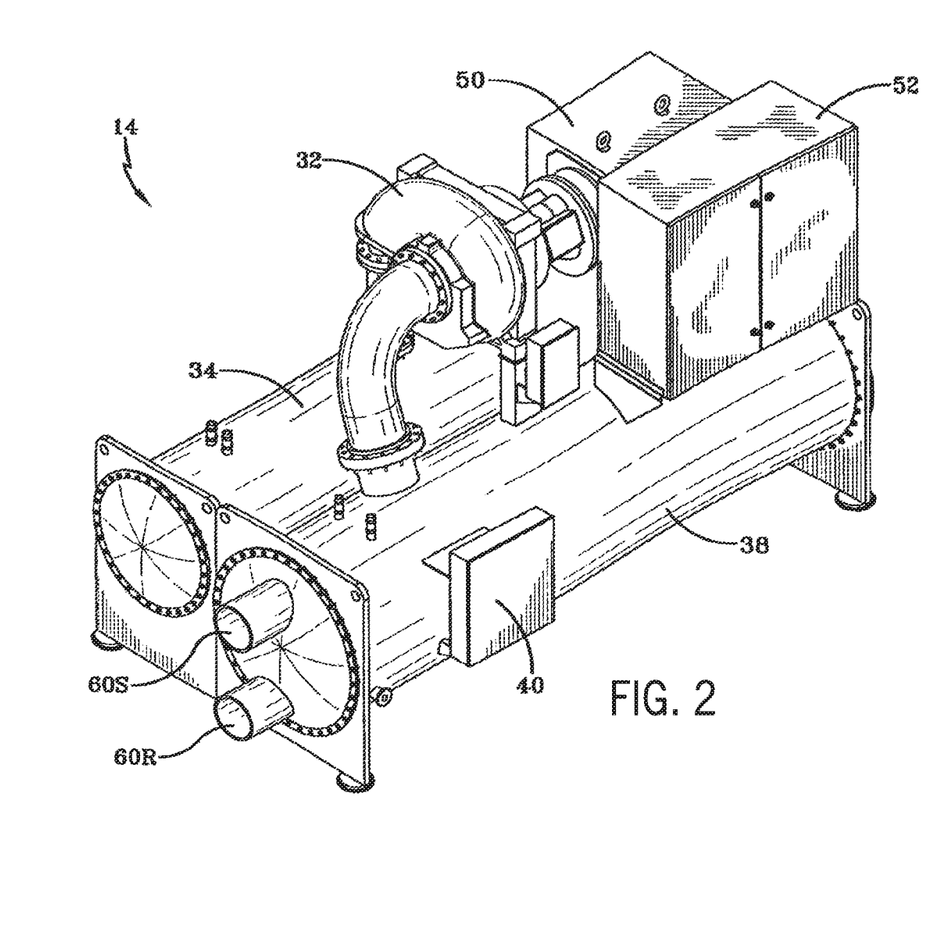
FIG. 2 illustrates an isometric view of an embodiment of a vapor compression system.
Figure 3:
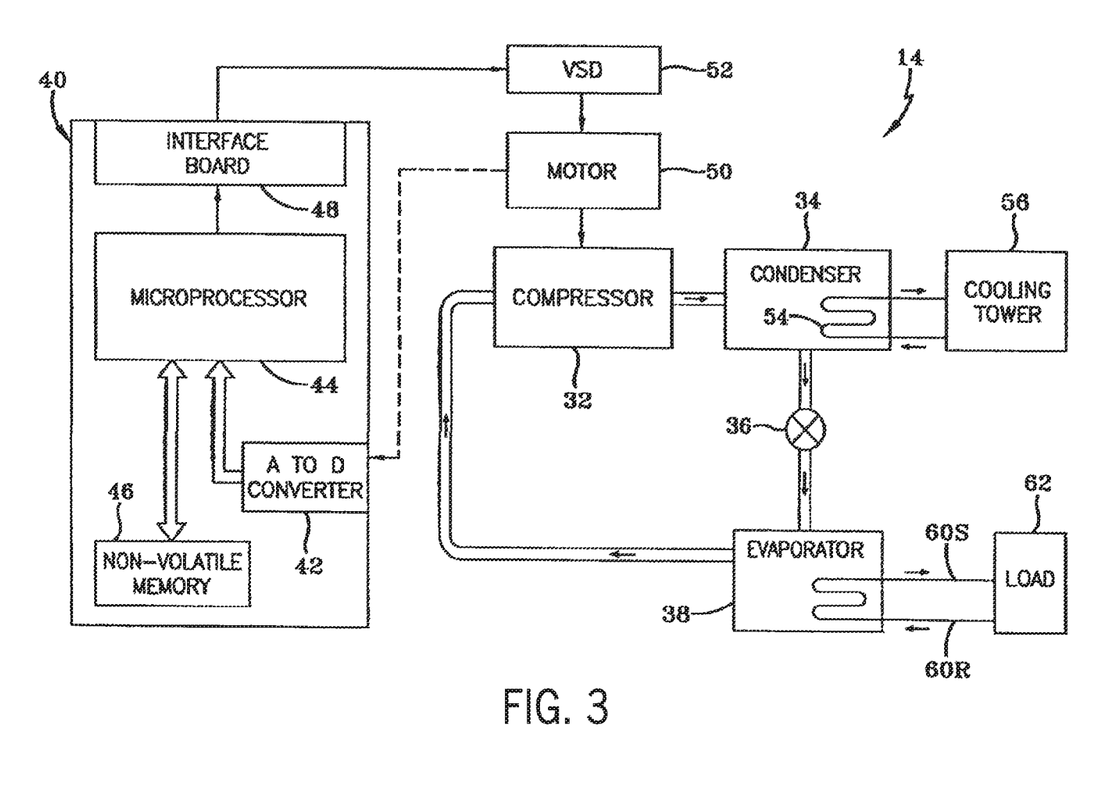
FIGS. 3 and 4 schematically illustrate embodiments of a vapor compression system.

FIGS. 2 and 3 show an embodiment of the vapor compression system 14 that can be used in the HVAC&R system 10. The vapor compression system 14 can circulate a refrigerant through a circuit starting with a compressor 32 and including a condenser 34, an expansion valve(s) or device(s) 36, and a liquid chiller or an evaporator 38. The vapor compression system 14 can also include a control panel 40 that can include an analog to digital (A/D) converter 42, a microprocessor 44, a non-volatile memory 46, and an interface board 48. Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable type of refrigerant. In some embodiments, the vapor compression system 14 may use one or more of each of variable speed drives (VSDs) 52, motors 50, compressors 32, condensers 34, expansion valves or devices 36 and/or evaporators 38.

The motor 50 used with the compressor 32 can be powered by a variable speed drive (VSD) 52 or can be powered directly from an alternating current (AC) or direct current (DC) power source. The VSD 52, if used, receives AC power having a particular fixed line voltage and fixed line frequency from the AC power source and provides power having a variable voltage and frequency to the motor 50. The motor 50 can include any type of electric motor that can be powered by a VSD or directly from an AC or DC power source. The motor 50 can be any other suitable motor type, for example, a switched reluctance motor, an induction motor, or an electronically commutated permanent magnet motor.

The compressor 32 compresses a refrigerant vapor and delivers the vapor to the condenser 34 through a discharge passage. The compressor 32 can be a centrifugal compressor in one embodiment. The refrigerant vapor delivered by the compressor 32 to the condenser 34 transfers heat to a fluid, for example, water or air. The refrigerant vapor condenses to a refrigerant liquid in the condenser 34 as a result of the heat transfer with the fluid. The liquid refrigerant from the condenser 34 flows through the expansion device 36 to the evaporator 38. In the embodiment shown in FIG. 3, the condenser 34 is water cooled and includes a tube bundle 54 connected to a cooling tower 56.

The liquid refrigerant delivered to the evaporator 38 absorbs heat from another fluid, which may or may not be the same type of fluid used for the condenser 34, and undergoes a phase change to a refrigerant vapor. In the embodiment shown in FIG. 3, the evaporator 38 includes a tube bundle (or other heat transfer surfaces) having a supply line 60S and a return line 60R connected to a cooling load 62. A process fluid, for example, water, ethylene glycol, calcium chloride brine, sodium chloride brine, or any other suitable liquid, enters the evaporator 38 via return line 60R and exits the evaporator 38 via supply line 60S. The evaporator 38 chills the temperature of the process fluid in the tubes (or flow passages of the heat exchanger). The tube bundle in the evaporator 38 can include a plurality of tubes and a plurality of tube bundles. The vapor refrigerant exits the evaporator 38 and returns to the compressor 32 by a suction line to complete the cycle.

Figure 4:
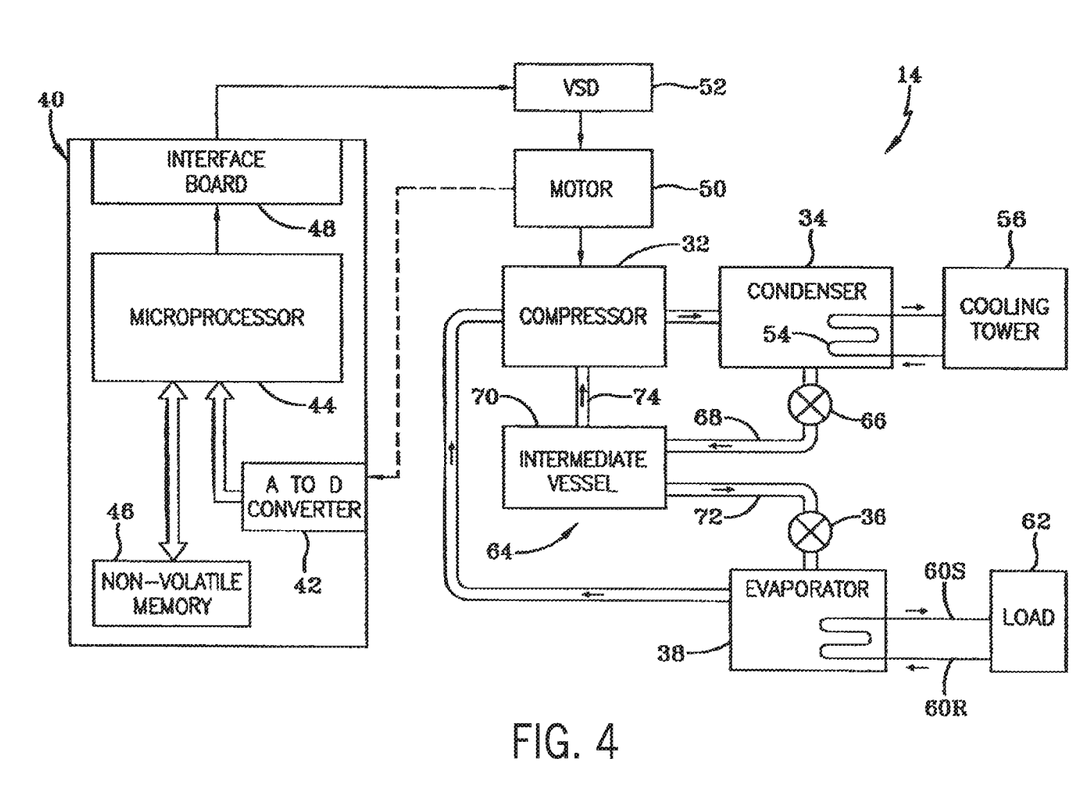

FIG. 4, which is similar to FIG. 3, shows the vapor compression system 14 with an intermediate circuit 64 incorporated between the condenser 34 and the expansion device 36. The intermediate circuit 64 has an inlet line 68 that can be either connected directly to or can be in fluid communication with the condenser 34. As shown, the inlet line 68 includes a first expansion device 66 positioned upstream of an intermediate vessel 70. The intermediate vessel 70 can be a flash tank, also referred to as a flash intercooler, in some embodiments. In other embodiments, the intermediate vessel 70 can be configured as a heat exchanger or a "surface economizer." In the configuration shown in FIG. 4, the intermediate vessel 70 is used as a flash tank and the first expansion device 66 operates to lower the pressure of the liquid received from the condenser 34. During the expansion process, a portion of the liquid vaporizes. The intermediate vessel 70 may be used to separate the vapor from the liquid received from the first expansion device 66 and may also permit further expansion of the liquid. The vapor may be drawn by the compressor 32 from the intermediate vessel 70 through a line 74 to the suction inlet, or as shown in FIG. 4, to a port at a pressure intermediate between suction and discharge or an intermediate stage of compression. The liquid that collects in the intermediate vessel 70 is at a lower enthalpy from the expansion process. The liquid from the intermediate vessel 70 flows in line 72 through a second expansion device 36 to the evaporator 38.

For purposes herein, the term metal-to-metal interface is intended to mean unlubricated metal surfaces that can contact each other, in which the metal surfaces move relative to each other during normal and/or abnormal operation of the system. Unlubricated surfaces are intended to include metal surfaces that may receive trace amounts of lubricating oil entrained in the refrigerant in the system.

Figure 5:
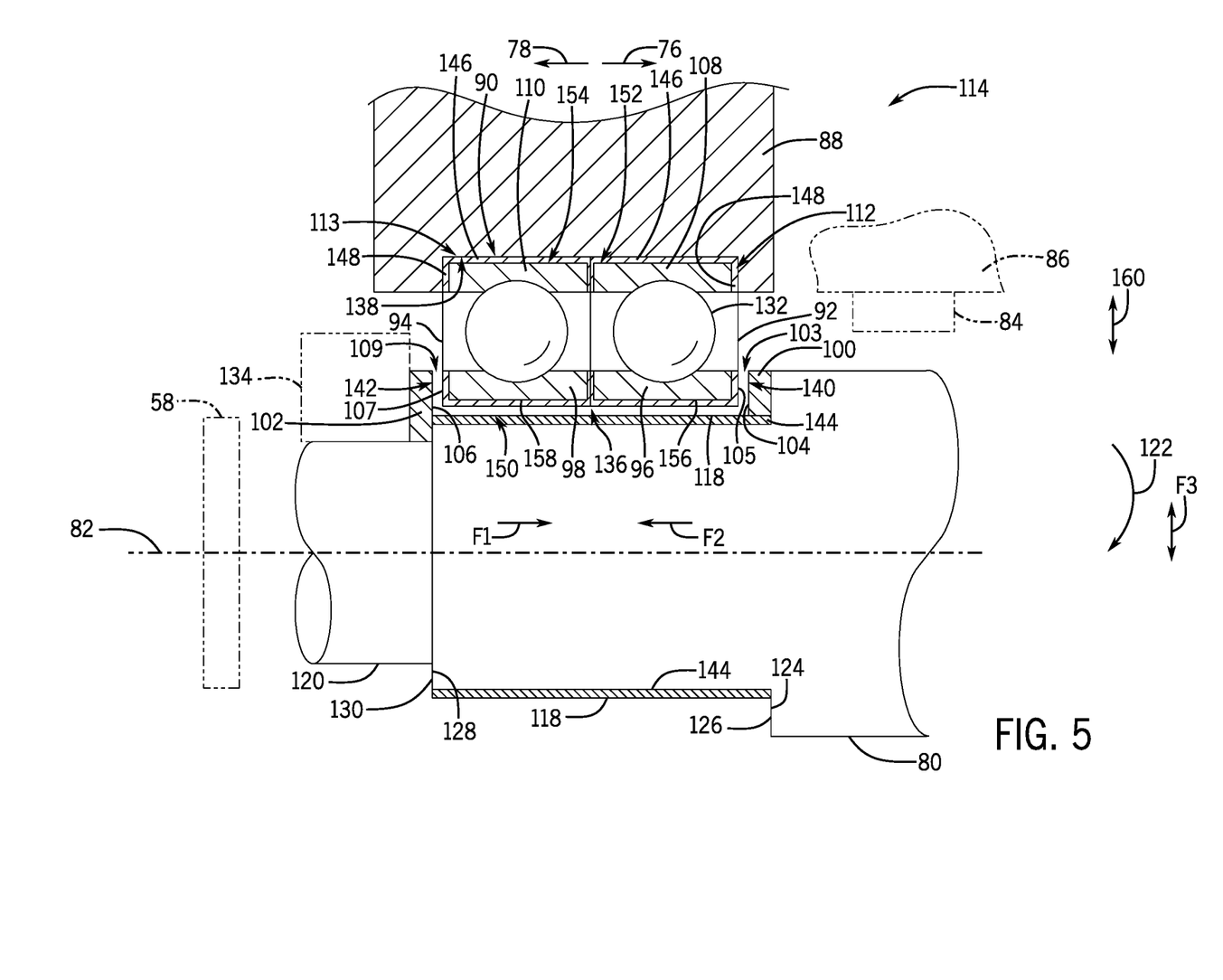
FIG. 5 illustrates a portion of an embodiment of an oil-free vapor compression system.

FIG. 5 shows an enlarged partial cross-sectional view of an embodiment of an oil-free vapor compression system 114. In one embodiment, the vapor compression system is not an oil free vapor compression system. An inboard direction 76 and an outboard direction 78 are utilized to help orient and identify surfaces of components discussed in further detail below. The system 114 includes a motor shaft 80 having an axis 82. The motor shaft 80 is urged into rotational movement 122 by the motor 50 (see, e.g., FIG. 3) for powering a system component, such as an impeller 58, usable with a centrifugal compressor. A primary bearing 84, such as a magnetic bearing supported by a support structure 86 is utilized to levitate, position, and rotatably support the motor shaft 80 during normal system operation, which may include ramping up and shutting down rotational movement 122 by motor shaft 80 and/or locating the shaft 80 axially at a target position. That is, primary bearings 84 are intended to provide radial and axial support to the motor shaft 80 while the motor shaft 80 is rotating. Secondary bearings 92, 94 are intended to support the motor shaft 80 after normal system shutdown has occurred, such that rotational movement 122 by the motor shaft 80 has been significantly reduced or ceased. In other words, the secondary bearings 92, 94, such as mechanical bearings, are generally not intended to contact motor shaft 80 while the motor shaft is rotating, especially during high rotational speeds of the motor shaft 80 associated with normal system operation.

However, during abnormal system operation, which may be caused by a temporary loss of function of the primary bearings 84, one or more surfaces of the secondary bearings 92, 94 are brought into contact with the motor shaft 80 and/or first bearing stop 100 or second bearing stop 102, as will be discussed in further detail below. In some cases, a temporary loss of function to the primary bearings 84 may occur as a result of introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to the impeller 58, or other reasons.

As further shown in FIG. 5, outer races 108, 110 of respective secondary bearings 92, 94 are secured in a circular groove or cylindrical space (e.g., annular space) 90 formed in a motor housing assembly or motor housing 88. The secondary bearings 92, 94, also referred to as mechanical bearings, comprise respective inner races 96, 98 radially supported relative to respective outer races 108, 110 by corresponding rolling elements 132. Although a pair (two) of the secondary bearings 92, 94 are shown in FIG. 5, the number of secondary bearings 92, 94 may be different from two, or a pair of secondary bearings 92, 94 may be designed as one unit sharing one inner race. It is appreciated that other configurations of mechanical bearings can be used. Upon assembly, a surface 138 of the cylindrical space 90 is brought into contact with corresponding surfaces of the outer races 108, 110 of respective secondary bearings 92, 94. In one embodiment, radial spring dampers 146 are positioned between the surface 138 and the outer races 108, 110. Inboard surface 112 of the motor housing assembly or motor housing 88 is brought into contact/close proximity with a corresponding inboard surface of outer race 108 of secondary bearing 92. Similarly, an outboard surface 113 of motor housing assembly or motor housing 88 is brought into contact/close proximity with a corresponding outboard surface of the outer race 110 of the secondary bearing 94. In one embodiment, axial spring dampers 148 are positioned between inboard surface 112 and corresponding surface of outer race 108, and outboard surface 113 and corresponding surface of outer race 110. As a result of assembling the outer races 108, 110 of secondary bearings 92, 94 in the cylindrical space 90, a spacing or gap 136 is created between inner races 96, 98 of the respective secondary bearings 92, 94 and a surface 118 during normal system operation. In other words, as a result of the gap 136, the inner races 96, 98 of the respective secondary bearings 92, 94 remain stationary relative to corresponding surface 118 of motor shaft 80 during normal operation.

During abnormal operations resulting from a temporary loss of function to the primary bearings 84, forces generated parallel to the axis 82 of the motor shaft 80, or axial forces generated along the motor shaft 80, are transmitted through secondary bearings 92, 94, and reacted (e.g., absorbed) by the motor housing 88. In some cases, temporary loss of function to the primary bearings 84 may occur as a result of introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to the impeller 58 or other reasons. To achieve the force transmission, as shown in FIG. 5, a first bearing stop 100 and a second bearing stop 102, each resembling a cylindrical ring, are positioned along shaft 80 on opposite sides of the secondary bearings 92, 94. That is, the first bearing stop 100 is affixed to the motor shaft 80. As shown in FIG. 5, the first bearing stop 100 forms an interference fit with the shaft surface 118. The first bearing stop 100 may be secured to the shaft surface 118 by a key, a pin, splines, fasteners, welding techniques, an adhesive, a threaded engagement, or another suitable method. In one embodiment, the first bearing stop 100 can be integral to the shaft 80, i.e., being of unitary or one piece construction. As further shown in FIG. 5, in the inboard direction 76, the shaft surface 118 terminates in a shoulder 124 having a radially outwardly extending surface 126. Also, in the inboard direction 76, a shaft surface 120 terminates in a shoulder 128 having a radially outwardly extending surface 130. The first bearing stop 100 is positioned between the surface 126 of the shoulder 124 of the motor shaft 80 and a corresponding inboard surface 105 of the inner race 96 of the secondary bearing 92. Accordingly, a gap 103 may be formed between the inner race 96 and the first bearing stop 100. The second bearing stop 102 is positioned between the surface 130 of the shoulder 128 of the motor shaft 80 and fasteners 134. As shown in FIG. 5, the second bearing stop 102 forms a slip fit with the shaft surface 120 and is secured by the fasteners 134. The second bearing stop 102 may be secured to the shaft surface 120 by a key, a pin, splines, an interference fit, welding techniques, an adhesive, a threaded engagement, or another suitable method. In one embodiment, the second bearing stop 102 can be integral to the shaft 80, i.e., being of unitary or one piece construction. Additionally, a gap 109 may form between the second bearing stop 102 and a corresponding outboard surface 107 of the inner race 98 of the secondary bearing 94. As a result of the fastening methods used, the bearing stops 100 and 102 are affixed to the motor shaft 80. That is, the bearing stops 100 and 102 experience the rotational movement 122 with the motor shaft 80 during operation. It is to be understood that other geometries of the motor shaft may also be used with the first and second bearing stops 100 and 102, so long as the first and second bearing stops 100 and 102 react axial forces transmitted parallel to the motor shaft 80 to the motor housing 88.

Also during abnormal operations resulting from a temporary loss of function to the primary bearings 84, radial forces generated perpendicular to axis 82 of motor shaft are transmitted through secondary bearings 92, 94, and reacted (e.g., absorbed) by motor housing 88. In some cases, the temporary loss of function to the primary bearings 84 may be caused by introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to the impeller 58, or other reasons. To achieve this force transmission, as shown in FIG. 5, outer surfaces 152, 154 of the respective outer races 108, 110 of the secondary bearings 92, 94 correspond to the cylindrical surface 90 of the motor housing 88. The rolling elements 132 are positioned between the outer races 108, 110 and the corresponding inner races 96, 98. Inner surfaces 156, 158 of the respective inner races 96, 98 of the secondary bearings 92, 94 correspond with the surface 118 of the motor shaft 80. In some embodiments, a sleeve 144 can be slid over the surface 118 of the shaft 80, with the sleeve 144 forming an interference fit with the motor shaft 80. The sleeve 144 can help protect the motor shaft 80 from wear associated with sliding contact and impact with the inner races 96, 98. Additionally or alternatively, axial dampers 148, such as spring dampers, are positioned between the outer surfaces 152, 154 of the respective outer races 108, 110 and the corresponding cylindrical surface 90 (e.g., the surface 138).

In response to movement of the motor shaft 80 in the inboard direction 76, resulting from a temporary loss of function of the primary bearings 84, a force F1 may be applied in the inboard direction 76 by the second bearing stop 102 to a corresponding outboard surface 107 of the inner race 98 of the secondary bearing 94 (e.g., while the motor shaft 80 is experiencing a high rate of the rotational movement 122). As discussed above, the temporary loss of function of the primary bearings 84 may occur as a result of introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to the impeller 58, or other reasons. As the force F1 is applied to the second bearing stop 102, a rapidly rotating surface 106 of the second bearing stop 102 is brought into contact with the corresponding outboard surface 107 of the inner race 98 of the secondary bearing 94 that had been at rest. Due to inertia of the inner race 98, there is sliding contact between the corresponding surfaces 106 and 107 of the second bearing stop 102 (e.g., surface 106) and the inner race 98 of the secondary bearing 94 until the corresponding surfaces 106 and 107 match rotational speeds. The inboard surface of the inner race 98 of the secondary bearing 94 is then brought into contact with the corresponding outboard surface of the inner race 96 of the secondary bearing 92, such that the rolling elements 132 ultimately transmit the force F1 to the outer race 108 of the secondary bearing 92. Accordingly, the force F1 is reacted (e.g., absorbed) by the motor housing 88. The sliding contact (e.g., between the second bearing stop 102 and/or the inner race 98 of the secondary bearing 94) can generate sufficiently elevated temperatures as a result of friction, which may cause the secondary bearings to incur abrasive wear. Abrasive wear can lead to debris generation which can then degrade the secondary bearings 92, 94 and the second bearing stop 102. Adhesion from wear can also result in change in the gap 109 between the secondary bearings 92, 94 and the motor shaft 80.

In response to movement of motor shaft 80 in a radial direction 160 brought about by, for example a temporary loss of function to the primary bearings 84, a force F3 may be applied in the radial directions 160 by the surface 118 of the motor shaft 80 and/or the rotating surface of sleeve 144 to the respective inner surfaces 156, 158 of the inner races 96, 98 of the secondary bearings 92, 94 (e.g., while the motor shaft 80 is experiencing a high rate of the rotational movement 122). As discussed above, the temporary loss of function to the primary bearings 84 may be caused by introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to impeller 58, or other reasons. As force F3 is applied to the inner surfaces 156, 158, the rapidly rotating surface 118 of the motor shaft 80 and/or the rotating surface of sleeve 144 is brought into contact with the corresponding inner surfaces 156, 158 of the inner races 96, 98 of the secondary bearings 92, 94 that had been at rest. Due to inertia of the inner races 96, 98 and the rolling elements 132, there is sliding contact between the corresponding surfaces of the motor shaft 80 (e.g., the surface 118) and/or the surface of the sleeve 144 and the inner surfaces 156, 158 of the inner races 96, 98 of the secondary bearings 92, 94 until the corresponding surfaces match rotational speeds. Force F3 is transmitted from the inner races 96, 98 to the respective rolling elements 132, and thus, to the respective outer races 108, 110. The respective outer races 108, 110 may ultimately transmit the force F3 to the corresponding cylindrical surface 90, where the force F3 is reacted (e.g., absorbed) by the motor housing 88. Additionally or alternatively, the force F3 is transmitted from the respective outer races 108, 110 to the dampers 146, and then ultimately transmitted to the corresponding cylindrical surface 90, where the force F3 is reacted by the motor housing 88.

In response to movement of motor shaft 80 in the outboard direction 78 resulting from a temporary loss of function to primary bearings 84, force F2 is applied in outboard direction 78 by the first bearing stop 100 to a corresponding inboard surface 105 of the inner race 96 of the secondary bearing 92 (e.g., while the motor shaft 80 is experiencing a high rate of the rotational movement 122). As discussed above, the temporary loss of function to the primary bearings 84 may be caused by the introduction of unforeseen imbalanced loads in the rotating system, sufficiently large changes in mechanical or gas loading, and/or an interruption in communication between the primary bearings 84 and an actuator (e.g., a magnetic bearing actuator). Changes in loading may stem from integrated operation of the system or such changes may be externally induced, such as applied to impeller 58, or other reasons. As the force F2 is applied to the first bearing stop 100, a rapidly rotating surface 104 of the first bearing stop 100 is brought into contact with the corresponding inboard surface 105 of the inner race 96 of the secondary bearing 92 that had been at rest. Due to inertia of the inner race 96 and the rolling elements 132, there is sliding contact between the corresponding surfaces of the first bearing stop 100 (e.g., the surface 104) and the inner race 96 of the secondary bearing 92 (e.g., the surface 105) until the corresponding surfaces match rotational speeds. The outboard surface of the inner race 96 of the secondary bearing 92 is then brought into contact with the corresponding inboard surface of the inner race 98 of the secondary bearing 94, such that the rolling elements 132 ultimately transmit the force F2 to the outer race 110 of the secondary bearing 94, where the force F2 is reacted (e.g., absorbed) by the motor housing 88. Such sliding contact (e.g., between the corresponding surfaces 104 and 105 of the first bearing stop 100 and the inner race 96) can generate sufficiently elevated temperatures as a result of friction, which may cause the secondary bearings 92, 94 to seize. Abrasive wear can lead to debris generation which can then degrade the secondary bearings 92, 94 and the second bearing stop 100. Adhesion from wear can also result in change in the gap 103 between the secondary bearings 92, 94 and the motor shaft 80.

In one embodiment the first and second bearing stops 100, 102 are composed of one of American Iron and Steel Institute (AISI) Grades A2, D2 and M2. However, in other embodiments, other suitable substrates can be used.

In order to extend the service life of the secondary bearings 92, 94, a protective layer 140 may be applied to at least a portion of the outboard surface 104 of the first bearing stop 100 facing the inner race 96 of the secondary bearing 92. Similarly, a protective layer 142 may be applied to at least a portion of the inboard surface 106 of the second bearing stop 102 facing the inner race 98 of the secondary bearing 94. Also, a protective layer 150 may be applied to at least a portion of the radial contact sleeve 144. In one embodiment, the material layers can form and maintain a skin having a relatively high level of hardness, possess thermal stability (e.g., resist deterioration under elevated temperature and pressure) and/or resist galling (e.g., abrasion resistance). For example, the material layers may be formed from materials that may include titanium nitride. However, in other embodiments, other titanium coatings may be utilized, such as titanium carbon nitride, titanium aluminium nitride, or other variations of titanium nitride. In some embodiments, the thickness of the material layers coating is sufficiently thin, such that dimensional tolerances of the first and second bearing stops 100, 102 may be maintained without subsequent machining of surfaces of the first and second bearing stops 100, 102. In some embodiments, the material layers include one of more of the above-referenced properties. In some embodiments, the material layers further include an anti-friction coating operating to fill asperities in surfaces of the first and second bearing stops 100, 102 corresponding to inner races of the secondary bearings 92, 94, in order to reduce frictional heat generation and galling. In still further embodiments, the anti-friction coating operating to fill asperities in surfaces of the first and second bearing stops 100, 102 corresponding to inner races of the secondary bearings 92, 94 is also transferred to the surfaces of the races of the secondary bearings 92, 94 for reducing friction. The anti-friction coating may be composed of a polymer. In some embodiments, the anti-friction coating is sufficiently thin, such that dimensional tolerances of the first and second bearing stops 100, 102 may be maintained without subsequent machining of surfaces of the first and second bearing stops 100, 102.

Figure 6:
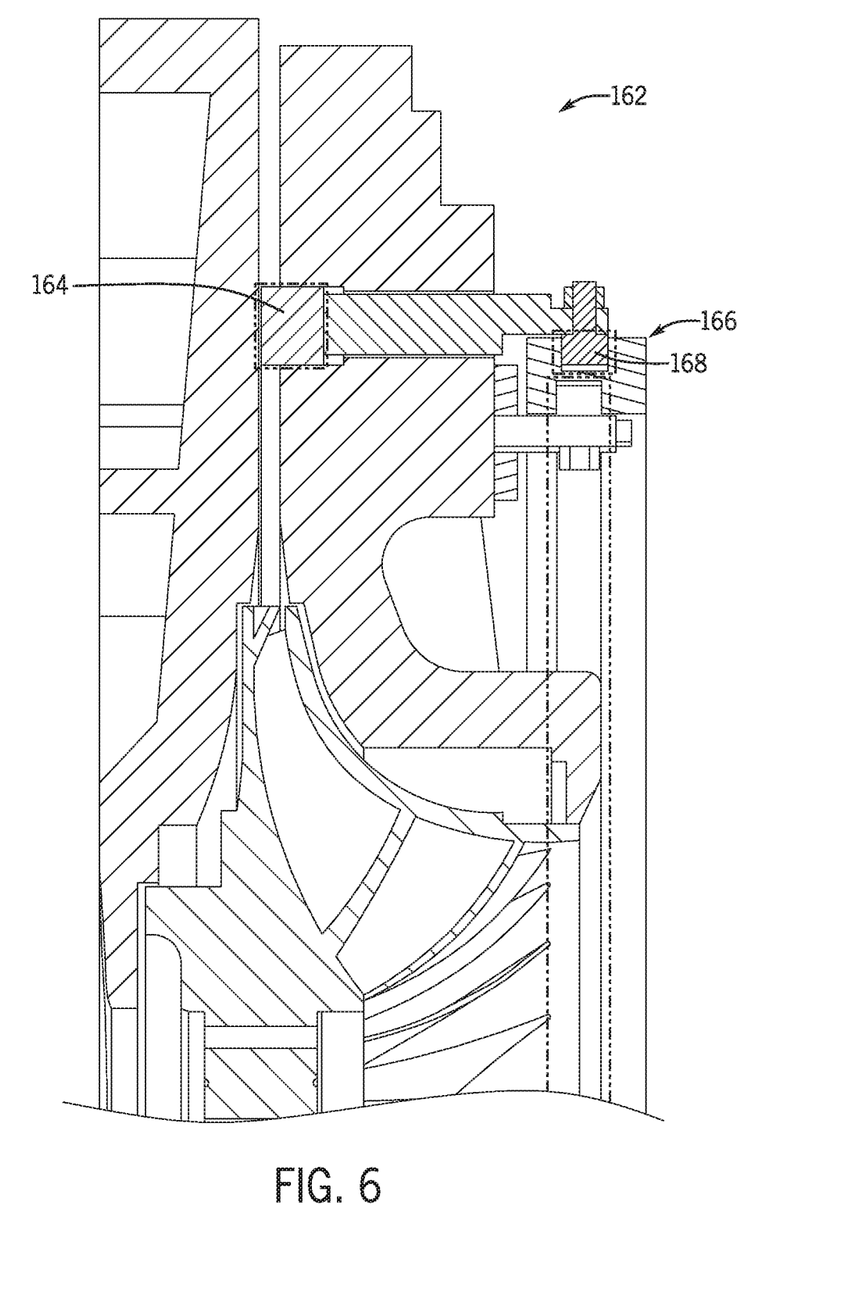
FIG. 6 illustrates an embodiment of a component having an unlubricated metal-to metal interface.

It is to be understood that other components associated with the vapor compression system 14 include unlubricated metal-to-metal interfaces. For example, as shown in FIG. 6, a variable geometry diffuser 162 includes multiple unlubricated metal-to metal interfaces, such as, but not limited to interfaces associated with a diffuser ring 164, drive ring 166, and cam follower 168.

While only certain features and embodiments of the disclosure have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosed subject matter, or those unrelated to enabling the claimed subject matter). It should be appreciated that in the development of any such actual implementation, as in any engineering or design project, numerous implementation-specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vapor compression system comprising:
a motor comprising a housing;
a shaft comprising a first shoulder having a first surface extending radially outward from the first shoulder and a second shoulder having a second surface extending radially outward from the second shoulder, wherein the first shoulder and the second shoulder are integrally formed with the shaft, and the shaft is urgable into rotational movement by the motor for powering a component of the vapor compression system;
a primary bearing and a secondary bearing positioned in the housing for rotatably supporting the shaft, the primary bearing rotatably supporting the shaft during normal system operation;
a sleeve surrounding the shaft and extending between the first surface and the second surface, wherein the sleeve is positioned between the shaft and the secondary bearing, and wherein a gap separates the sleeve and the secondary bearing during normal system operation; and
a first bearing stop positioned between a first side of the secondary bearing and the first surface and a second bearing stop positioned adjacent to a second side of the secondary bearing, opposite the first side, wherein the first bearing stop is positioned against the first surface during normal system operation, wherein the second bearing stop is positioned against the second surface, wherein the second bearing stop forms a slip fit with the shaft, and wherein the first bearing stop and the second bearing stop are configured to transmit axial forces generated along the shaft for reaction by the housing during abnormal system operation;
wherein at least a portion of corresponding surfaces of each of the first bearing stop and the second bearing stop facing the secondary bearing comprises a protective overlying layer of material applied thereto.

2. The vapor compression system of claim 1, wherein the protective overlying layer of material comprises titanium nitride, titanium carbon nitride, or titanium aluminum nitride.

3. The vapor compression system of claim 1, wherein the primary bearing is a magnetic bearing.

4. The vapor compression system of claim 1, wherein the secondary bearing is a mechanical bearing.

5. The vapor compression system of claim 1, wherein the first bearing stop is affixed to the shaft.

6. The vapor compression system of claim 5, wherein the first bearing stop forms an interference fit with the shaft.

7. The vapor compression system of claim 5, wherein the first bearing stop is threadedly engaged with the shaft.

8. The vapor compression system of claim 1, wherein the portion of the corresponding surfaces of each of the first bearing stop and the second bearing stop having the protective overlying layer of material applied thereto are adapted to contact an inner race of the secondary bearing during abnormal system operation.

9. The vapor compression system of claim 1, wherein the vapor compression system is an oil-free vapor compression system.

10. The vapor compression system of claim 1, wherein the component of the vapor compression system comprises a compressor having a variable geometry diffuser, wherein the variable geometry diffuser comprises a metal-to-metal interface in which at least a portion of the metal-to-metal interface comprises an additional protective overlying layer of material applied thereto.

11. The vapor compression system of claim 1, wherein the component of the vapor compression system comprises a variable geometry diffuser or a multistage compressor.

12. An oil-free vapor compression system comprising:
a motor comprising a housing;
a shaft comprising a first shoulder having a first surface extending radially outward from the first shoulder and a second shoulder having a second surface extending radially outward from the second shoulder, wherein the first shoulder and the second shoulder are integrally formed with the shaft, and the shaft is urgable into rotational movement by the motor for powering a system component;
a magnetic bearing and a mechanical bearing positioned in the housing for rotatably supporting the shaft, the magnetic bearing rotatably supporting the shaft during normal system operation;
a sleeve surrounding the shaft and extending between the first surface and the second surface, wherein the sleeve is positioned between the shaft and the mechanical bearing, and wherein a first gap separates the sleeve and the mechanical bearing during normal system operation; and
a first bearing stop positioned between a first side of the mechanical bearing and the first surface and a second bearing stop positioned adjacent to a second side of the mechanical bearing, opposite the first side, wherein the first bearing stop is positioned against the first surface, wherein the second bearing stop is positioned against the second surface, wherein a second gap separates the first bearing stop and the mechanical bearing during normal system operation, wherein the second bearing stop forms a slip fit with the shaft, and wherein the first bearing stop and the second bearing stop are configured to transmit axial forces generated along the shaft for reaction by the housing during abnormal system operation;
wherein at least a portion of corresponding surfaces of each of the first bearing stop and the second bearing stop facing the mechanical bearing comprises a protective overlying layer of material applied thereto.

13. A method of extending service life of an oil-free vapor compression system, comprising:
providing a motor having a housing, a shaft having a first shoulder comprising a first surface extending radially outward from the first shoulder and a second shoulder comprising a second surface extending radially outward from the second shoulder, the first shoulder and the second shoulder being integrally formed with the shaft, and the shaft urgable into rotational movement by the motor for powering a system component, a primary bearing and a secondary bearing positioned in the housing for rotatably supporting the shaft, the primary bearing rotatably supporting the shaft during normal system operation, a sleeve surrounding the shaft, extending between the first surface and the second surface, and positioned between the shaft and the secondary bearing, a first bearing stop positioned between a first side of the secondary bearing and the first surface and a second bearing stop positioned adjacent to a second side of the secondary bearing, opposite the first side, wherein a gap separates the sleeve and the secondary bearing during normal system operation, wherein the first bearing stop is positioned against the first surface, wherein the second bearing stop is positioned against the second surface, wherein the first bearing stop is affixed to the shaft, wherein the second bearing stop forms a slip fit with the shaft, and wherein the first bearing stop and the second bearing stop are configured to transmit axial forces generated along the shaft for reaction by the housing; and
applying a protective overlying layer of material to at least a portion of corresponding surfaces of each of the first bearing stop and the second bearing stop facing the secondary bearing.

14. The method of claim 13, wherein a composition of the first bearing stop and the second bearing stop is taken from the group consisting of AISI A2, D2 or M2 tool steel.

15. The method of claim 13, wherein applying the protective overlying layer of material does not comprise machining the portion of the corresponding surfaces of each of the first bearing stop and the second bearing stop facing the secondary bearing subsequent to application of the protective overlying layer of material.

16. The method of claim 15, comprising applying an anti-friction coating on the protective overlying layer of material.

17. The method of claim 16, wherein applying the anti-friction coating on the protective overlying layer of material does not comprise machining the portion of the corresponding surfaces of each of the first bearing stop and the second bearing stop facing the secondary bearing subsequent to application of the anti-friction coating.

18. The vapor compression system of claim 1, wherein the secondary bearing is secured to the housing.

* * * * *